United States Patent [19]

Zannucci

[11] 4,355,080

[45] Oct. 19, 1982

[54] POLYESTER-ACRYLIC COMPOSITE SHEET HAVING IMPROVED WEATHERABILITY

[75] Inventor: Joseph S. Zannucci, Kingsport, Tenn.

[73] Assignee: Eastman Kodak Company, Rochester, N.Y.

[21] Appl. No.: 239,784

[22] Filed: Mar. 2, 1981

[51] Int. Cl.³ .................. B32B 27/08; B32B 27/18; B32B 27/36

[52] U.S. Cl. .................................. 428/483; 428/522

[58] Field of Search .................. 428/480, 483, 522

[56] References Cited

U.S. PATENT DOCUMENTS 2,901,466 8/1959 Kibler et al. .................. 528/288
4,064,314 12/1977 McKenzie .................. 428/483

Primary Examiner—William J. Van Balen
Attorney, Agent, or Firm—Donald W. Spurrell; Daniel B. Reece, III

[57] ABSTRACT

Disclosed are polyester substrates or sheets laminated with an acrylic film and having exceptionally improved resistance to surface deterioration on weathering. These laminates are especially suited for use in applications such as windows, signs, solar collectors, green house covers and the like which are subject to extended periods of outdoor exposure. Typical polyesters include modified poly(ethylene terephthalate), and modified poly(1,4-cyclohexylenedimethylene terephthalate) such as those of terephthalic acid with ethylene glycol and 1,4-cyclohexanedimethanol, e.g., poly(69/31 molar-ethylene/1,4-cyclohexylenedimethylene terephthalate) and poly(65/35 molar-1,4-cyclohexylenedimethylene/ethylene terephthalate). The acrylic polymer films suitable for lamination to the polyester sheeting are homopolymers and copolymers prepared from either or both of the monomers $H_2C{=}CHCO_2R$ and $H_2C{=}C(CH_3)CO_2R^1$ wherein R and $R^1$ are each selected from $C_1-C_{12}$ linear or branched alkyl groups.

7 Claims, No Drawings

POLYESTER-ACRYLIC COMPOSITE SHEET HAVING IMPROVED WEATHERABILITY

This invention concerns improvements in polyester sheet material, and in particular to the stability thereof to weathering from light, heat, water and the like.

Polyesters such as poly(ethylene terephthalate) and poly(1,4-cyclohexylenedimethylene terephthalate) have not found acceptance as sheeting materials for signs, windows and the like because of embrittlement and surface deterioration on ageing, particularly under outdoor weathering conditions. These polyesters also crystallize rapidly under vacuum forming conditions, i.e., where the sheeting is heated to its softening point and then vacuum formed. Also, many copolyesters such as those of terephthalic acid with ethylene glycol and 1,4-cyclohexanedimethanol such as poly(69/31 molar-ethylene/1,4-cyclohexylenedimethylene terephthalate) and poly(65/35 molar-1,4-cyclohexylenedimethylene/ethylene terephthalate) while retaining their physical properties and clarity on standing, develop surface crazing and haze after relatively short periods of outdoor weathering, even when compounded with ultraviolet light stabilizers. Attempts to protect the surface of such polyester sheeting with various commercial films have failed either because of poor adhesion or poor heat stability.

In accordance with the present invention it has been found that films of certain acrylic polymers can be compression laminated to the surface of polyester substrates to produce a permanently bonded composite sheet having excellent retention of surface and physical properties on extended weathering. These composites retain surface appearance longer than commercial sheeting materials made from such standards as polycarbonates and cellulose acetate butyrates.

Acrylic films suitable for lamination to polyester sheeting in accordance with the present invention are polymers and copolymers prepared from either or both of the monomers $H_2C=CHCO_2R$ and $H_2C=C(CH_3)CO_2R^1$ wherein R and $R^1$ are each selected from $C_1-C_{12}$ linear or branched alkyl groups. It is known, of course, to modify acrylic polymers with minor amounts, e.g., up to about 15 molar percent with such comonomers as styrene, vinylacetate, and 2-methyl-5-vinyl pyridine, and such copolymers are included within the term "polyacrylic material" as used herein. The polyacrylic material having special utility herein are polymers prepared from predominant amounts of the three components comprising either methyl or butyl acrylate, butyl methacrylate and methylmethacrylate in weight ratios of from about 6-12/18-28/60-76. Particularly preferred are those of the ratios 8-11/21-25/65-71. These films may be of any thickness but preferably are from about 0.01 to about 10.0 or more mils, and most preferably from about 0.1 to about 5.0 mils.

The following is a typical batch type preparation for the acrylic polymer:

| | |
|---|---|
| Water-to-monomers weight ratio | 3-4 |
| Polymerization temperature | 215-250° C. |
| Polymerization pressure | 20-40 psig |
| Polymerization cycle, excluding cooling | 1-2 hrs. |
| Cooling cycle | 0.5-1.5 hrs. |

| Typical Polymerization Recipe | Parts |
|---|---|
| Monomers | 100 |
| Catalyst (peroxide) | 0.5 |
| Suspending agent | 1 |
| Stabilizer | 1 |
| Chain-transfer agent | 0.1 |
| Lubricant | 1 |

In such a preparation, the suspending agent such as anhydrous disodium phosphate, and preferably a protective colloid such as sodium polyacrylate are dissolved in demineralized water (aqueous system) in a stainless steel vessel with agitator on. The catalyst, preferably benzoyl peroxide, a lubricant such as stearic acid and a chain-transfer agent such as ethyl crotonate are dissolved in methyl methacrylate and ethyl acrylate (1:2 molar ratio) in a separate, agitated glass-lined kettle having external cooling means. The aqueous system is charged to a pressure reactor, agitation started, and the monomer system added. The reactor is nitrogen sparged for a few minutes and the charge then heated to start the polymerization. The heat, typically steam, is terminated when the suspension reaches about 212° F. The temperature thereafter is allowed to rise to about 230° F. where it is maintained by a water cooled jacket during the polymerization. The suspension is cooled to about room temperature, and then fed to a suitable device for separating the beads from the reaction medium, e.g., a conical bowl centrifuge where the beads are isolated and water washed. The beads are then dried, and pelletized or extruded, for example, into sheets.

Polyesters useful in the present invention are prepared by reaction conditions well known in the art. These polyesters may be homopolyesters or copolyesters such as those of U.S. Pat. No. 2,901,466 prepared by reacting a dibasic acid or its ester such as dimethyl terephthalate, or mixtures of such acids with aliphatic glycols or glycol mixtures. Other such dibasic acids (the term includes their condensable esters) which may be used at least as modifiers, include trans-hexahydroterephthalic, p,p'-sulfonyldibenzoic, 4,4'-diphenic, 4,4'-benzophenonedicarboxylic, 1,2-di(p-carboxyphenyl)ethane, 1,2-di(p-carboxyphenoxy)ethane, 4,4'-dicarboxydiphenyl ether, oxalic, carbonic, succinic, adipic, sebacic, azelaic, α-ethylsuberic, α,α-diethyladipic, dimethylmalonic, dicarboxy diethyl ether, isophthalic, orthophthalic, hexahydro-orthophthalic, hydroxypivalic, hydroxybutyric, hydroxycaproic, and p-hydroxybenzoic.

Examples of useful glycols including modifying glycols which can be employed in accordance with this invention include the polymethylene glycols containing from 2 to 10 or more carbon atoms, e.g., ethylene glycol, 1,5-pentanediol and 1,10-decanediol, diethylene glycol, triethylene glycol, 1,3-propanediol, 2-methyl-1,5-pentanediol, 1,4-cyclohexanedimethanol, 1,4-di(hydroxyethyl)benzene, and the like. Other glycols which can be employed include various derivatives of those above mentioned which contain nitrogenous substituents or other substituents which do not interfere with the formation of a highly polymeric linear polyester.

The polyesters must be amorphous and remain amorphous under weathering and sheet forming conditions, and must be formable readily into films, sheets or molded objects. Preferred polyesters are comprised of terephthalic acid and in a molar ratio of from about 70/30 to about 30/70 ethylene glycol and cis- or trans-1,4-cyclohexanedimethanol. A different but particularly useful polyester, however, is poly(2,2-dimethylpropylene terephthalate). The polyesters should have an inherent viscosity (I.V.) of at least 0.4, and up to about 1.6 as measured at 25° C. using 0.50 grams of polymer per 100 ml. of solvent composed of 60 volumes of phenol and 40 volumes of tetrachloroethane using a modified Wagner viscometer with a 0.55-mm capillary and a 0.5-mL bulb, and having a flow time of 100±15 seconds with the solvent-blank. The inherent viscosity is determined at a polymer concentration of 0.50 g/100 ml of solvent. The calculation is I.V.=2×ln (sample flow time/solvent-blank flow time).

The preferred polyesters also have an ASTM (D648-56) 264 psi heat deflection temperature >60° C., and the film thickness should be between 0.01 and 5.0 mils.

Various conventional stabilizers for the polyesters and the acrylic polymers may be used in stabilizing amounts, typically concentrations of from, e.g., 0.05 to 5.0% by weight, such as ultraviolet light stabilizers of the o-hydroxybenzophenone type, e.g., 2-hydroxy-4-dodecyloxybenzophenone, the bichromophoric types such as those mentioned in U.S. Pat. No. 3,864,354, and the like, and the phosphorous containing stabilizers such as distearyl pentaerythritol diphosphite, phosphoric acid, lauryl acid phosphite and the like. Especially preferred stabilizers are those of the formula

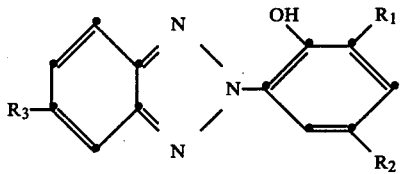

wherein $R_1$ and $R_2$ are linear or branched $C_1$-$C_{10}$ alkyl groups or H, and $R_3$ is H or Cl, wherein specific ones of these are 2(2'-hydroxy-5'-methylphenyl)benzotriazole; 2-(3',5'-di-tert-butyl-2'-hydroxyphenyl)-5-chlorobenzotriazole;

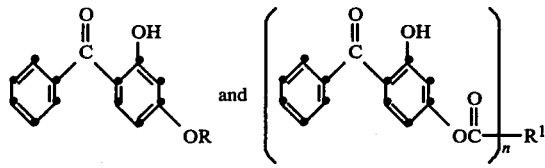

wherein R is a linear or branched $C_1$-$C_{10}$ alkyl group, n is 1-3, and R' is a linear or branched, substituted or unsubstituted $C_1$-$C_{10}$ alkyl or alkylene group, a cyclic alkyl group, or an aromatic group, exemplified by 4-dodecyloxy-2-hydroxybenzophenone, 4-octyloxy-2-hydroxybenzophenone, bis[2-(4-benzoyl-3-hydroxyphenoxy)ethyl]maleate, and tris[2-(4-benzoyl-3-hydroxyphenoxy)ethyl]trimellitate.

The invention will be further illustrated by the following examples although it will be understood that these examples are included merely for purposes of illustration and are not intended to limit the scope of the invention.

EXAMPLE 1

A commercial, pelletized polyester having an I.V. of 0.72 and prepared from terephthalic acid, 1,4-cyclohexanedimethanol, and ethylene glycol in a molar ratio of 1:0.65:0.35 was dry-blended with 1.0% by weight of each of the commercial stabilizers given below, melt extruded, pelletized, and molded into flat bars ½×2½×1/16 inches:

| | |
|---|---|
| Tinuvin ® P | 2(2'-hydroxy-5'-methylphenyl)benzotriazole |
| Tinuvin ® 144 | a hindered amine |
| Cyasorb ® UV-24 | 2,2'-dihydroxy-4-methoxybenzophenone |
| Cyasorb ® UV-3100 | p-methoxy benzylidenemalonic acid, diethyl ester |
| DOBP | 2-hydroxy-4-dodecyloxybenzophenone |
| Uvinul ® N-539 | 2-ethylhexyl-2-cyano-3,3-diphenyl acrylate |
| Uvinul ® N-35 | a substituted acrylonitrile |
| Irgastab ® 2002 | nickel salt of [o-ethyl(3,5-di-tert-butyl-4-hydroxybenzyl)]phosphonate |
| Ferro ® AM-340 | 2,4-di-t-butylphenyl-3,5-di-t-butyl-4-hydroxybenzoate |
| Sanduvor ® N-PU | [1-phenyl-3-methyl-4-decanoylpyrazolate (5)]$_2$-Ni$^{+2}$ |
| Sanduvor ® E-PU | oxalic anilide derivative |

Each of the bars was placed in an Atlas XWR Weather-Ometer ®, operated at 63° C. with a carbon arc lamp, with water spray for 18 minutes out of every 120 minutes, and the time for each bar to develop surface haze was noted. All of the bars developed considerable surface haze in less than 1000 hours.

EXAMPLE 2

Acrylic film (2-mils thick) comprised of about 9.0% by wt. methyl acrylate, 23.0% by wt. butyl methacrylate, and 68.0% by wt. methyl methacrylate, and containing 1.0% DOBP was laminated to the surface of a 123 mil thick polyester sheet prepared from terephthalic acid, 1,4-cyclohexanedimethanol and ethylene glycol in a molar ratio of 1:0.31:0.69 and stabilized with 1% Cyasorb ® 5411 and 0.5% Weston ® 618 by feeding the acrylic film in at the nip of the polyester sheet during extrusion thereof followed by calendering on a three-roll stack. Cyasorb ® 5411 is 2-[2'-hydroxy-5'-t-octylphenyl]benzotriazole, and Weston ® 618 is distearyl pentaerythritol diphosphite. The temperature of the calender rolls, from top to bottom, were: 100° F., 125° F. and 150° F. Roll pressure was 40–60 psi. Three inch square plaques of this laminate were cut from the finished sheeting and weathered in an Atlas XWR Weather-Ometer ® as in Example 1. For comparison, similar but non-laminated plaques of a commercial polycarbonate sheeting, Lexan ®, and of a commercial cellulose acetate butyrate sheeting, Uvex ®, were given the same weathering treatment. The results of this weathering on surface appearance is summarized in Table I below.

In addition to surface appearance, the effect of the weathering on falling weight impact strength was determined at 1000 and 2000 hours according to ASTM D3029 by striking the exposed side of the weathered samples (samples were not clamped during this test). The results are shown in Table II which also gives the sample formulations.

TABLE 1

Surface Retention of Selected Sheeting on Accelerated Weathering

| Formulation | Surface Appearance[1] Hours Exposed In XWR Weather-Ometer® | | | | |
|---|---|---|---|---|---|
| | 0 | 1000 | 1500 | 2000 | 3000 |
| Lexan® - Commercial Polycarbonate Sheeting | E | E | G | F | P |
| Uvex® - Commercial Cellulose Acetate Butyrate | E | E | E | F | P |
| Kodar® - Present Laminate | E | E | E | E | G |

[1]E = Excellent; G = Good; F = Fair; P = Poor

TABLE 2

Effect of Accelerated Weathering On Falling Weight Impact Strength

| Formulation | Hours Exposed In XWR Weather-Ometer | | |
|---|---|---|---|
| | Initial Strength at 0 Hrs. | 1000 Hrs. | 2000 Hrs. |
| Polyester film of Example 2 laminated with 3-mil thick acrylic film of Example 2 | 31 | 31 | 13 |
| Polyester film of Example 2 stabilized with a mixture of 1% Cyasorb® 5411 and 0.5% Weston® 618 and laminated with 2-mil thick acrylic film of Example 2 | 30 | 28 | 24 |
| Uvex® | 21 | 13 | 6 |

The invention has been described in detail with particular reference to preferred embodiments thereof, but it will be understood that variations and modifications can be effected within the spirit and scope of the invention.

I claim:

1. A polyester-polyacrylic composite article comprising a substrate of an amorphous, essentially unoriented polyester material having an inherent viscosity of at least 0.4, having laminated to its surface a film of polyacrylic material prepared from either or both of the monomers $H_2C=CHCO_2R$ and $H_2C=C(CH_3)CO_2R^1$ wherein R and $R^1$ are each selected from $C_1$-$C_{12}$ linear or branched alkyl groups.

2. The article of claim 1 wherein the polyacrylic material comprises butyl acrylate, butyl methacrylate and methyl methacrylate in weight ratios of from about 6-12/18-28/60-76.

3. The article of claim 2 wherein the polyester material comprises at least one dibasic carboxylic acid and at least two bifunctional dihydroxy compounds at least 50 mole percent of said dihydroxy compounds comprising at least one of the cis- and trans- isomers of 1,4-cyclohexanedimethanol.

4. The article of claim 2 wherein the polyester material is selected from copolymers of terephthalic acid, ethylene glycol and 1,4-cyclohexanedimethanol in molar ratios of 1/0.7/0.3 to 1/0.3/0.7.

5. The article of claim 1 wherein the polyester material is poly(2,2-dimethylpropylene terephthalate).

6. The article of claim 1 wherein either or both of the polyester material and the polyacrylic material contains a stabilizing amount of one or more compounds selected from

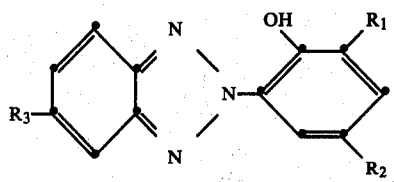

wherein $R_1$ and $R_2$ are linear or branched $C_1$-$C_{10}$ alkyl groups or H, and $R_3$ is H or Cl, and those of the formulae

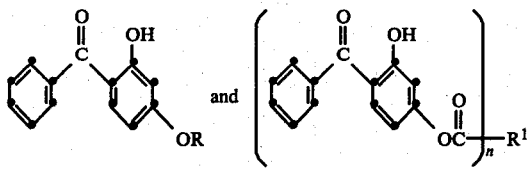

wherein R is a linear or branched $C_1$-$C_{10}$ alkyl group, n is 1-3, and R' is a linear or branched, substituted or unsubstituted $C_1$-$C_{10}$ alkyl or alkylene group, a cyclic alkyl group, or an aromatic group.

7. The article of claim 6 wherein the stabilizing compound is selected from one or more of 2(2'-hydroxy-5'-methylphenyl)benzotriazole; 2-(3',5'-di-tert-butyl-2-hydroxyphenyl)-5-chlorobenzotriazole; 2-(3'-tert-butyl-5'-methylphenyl)-5-chlorobenzotriazole; 2-(2'-hydroxy-5'-t-octylphenyl)benzotriazole; 4-dodecyloxy-2-hydroxybenzophenone; 4-octyloxy-2-hydroxybenzophenone; bis[2-(4-benzoyl-3-hydroxyphenoxy)ethyl]maleate; and tris[2-(4-benzoyl-3-hydroxyphenoxy)ethyl]trimellitate.

* * * * *

UNITED STATES PATENT AND TRADEMARK OFFICE
CERTIFICATE OF CORRECTION

PATENT NO. : 4,355,080

DATED : October 19, 1982

INVENTOR(S) : Joseph S. Zannucci

It is certified that error appears in the above—identified patent and that said Letters Patent is hereby corrected as shown below:

Column 6, line 42, "2-(3',5'-di-tert-butyl-2-" should read --- 2-(3',5'-di-tert-butyl-2'- ---.

Signed and Sealed this

Eighteenth Day of January 1983

[SEAL]

Attest:

GERALD J. MOSSINGHOFF

Attesting Officer     Commissioner of Patents and Trademarks